US006365240B1

(12) United States Patent
Banerjee et al.

(10) Patent No.: US 6,365,240 B1
(45) Date of Patent: Apr. 2, 2002

(54) METHOD FOR LOWERING THE VOCS EMITTED DURING DRYING OF WOOD PRODUCTS

(75) Inventors: Sujit Banerjee, Marietta, GA (US); James Robert Boerner, Cincinnati, OH (US); Wei Su, Marietta, GA (US)

(73) Assignee: Institute of Paper Sciences and Technology, Inc., Atlanta, GA (US)

( * ) Notice: Subject to any disclaimer, the term of this patent is extended or adjusted under 35 U.S.C. 154(b) by 0 days.

(21) Appl. No.: 09/490,810

(22) Filed: Jan. 26, 2000

Related U.S. Application Data

(62) Division of application No. 08/990,302, filed on Dec. 15, 1997, now Pat. No. 6,029,368.

(51) Int. Cl.[7] .................................................. A01N 1/00

(52) U.S. Cl. ......................... 428/15; 428/537.1; 34/419

(58) Field of Search .......................... 428/15, 192, 326, 428/537.1; 530/202; 34/502, 420, 419

(56) References Cited

U.S. PATENT DOCUMENTS

| | | | | |
|---|---|---|---|---|
| 2,307,344 A | | 1/1943 | Zottu | 219/47 |
| 2,543,618 A | | 2/1951 | Wood | 34/1 |
| 2,631,109 A | | 3/1953 | Gard | 117/59 |
| 3,083,470 A | | 4/1963 | Pless | 34/1 |
| 4,406,070 A | | 9/1983 | Preston | 34/1 |
| 4,567,340 A | | 1/1986 | Latchum, Jr. | 219/10.41 |
| 5,024,004 A | | 6/1991 | Jaeger | 34/1 |
| 5,103,575 A | | 4/1992 | Yokoo et al. | 34/1 |
| 5,245,154 A | | 9/1993 | Sato et al. | 219/10.81 |
| 5,524,361 A | * | 6/1996 | Dexter et al. | 34/502 |
| 5,698,667 A | * | 12/1997 | Speaks et al. | 530/202 |

* cited by examiner

*Primary Examiner*—Deborah Jones
*Assistant Examiner*—Abraham Bahta
(74) *Attorney, Agent, or Firm*—Fitch, Even, Tabin & Flannery

(57) ABSTRACT

The present invention is directed to a method for removal of VOCs from wood products prior to drying the wood products. The method of the invention includes the steps of providing a chamber having an opening for receiving wood and loading the chamber with green wood. The wood is loaded to an extent sufficient to provide a limited headspace in the chamber. The chamber is then closed and the wood is heated in the chamber for a time and at a temperature sufficient to saturate the headspace with moisture and to substantially transfer VOCs from the wood product to the moisture in the headspace.

7 Claims, 5 Drawing Sheets

METHOD FOR LOWERING THE VOCS EMITTED DURING DRYING OF WOOD PRODUCTS

This is a division, continuation-in-part, of prior application number 08/990,302 , filed Dec. 15. 1997 now U.S. Pat. No. 6,029,368 which is hereby incorporated herein by reference in its entirety.

FIELD OF THE INVENTION

The present invention relates generally to a method for lowering the volatile organic compounds (VOCs) emitted during drying of wood products. More particularly, the present invention relates to a method for lowering the VOCs content of wood products by maintaining the wood products at an elevated temperature in a closed chamber with limited headspace.

BACKGROUND OF THE INVENTION

Environmental concern has become increasingly important in respect to the release of volatile organic compounds (VOCs) into the atmosphere. This concern has been principally directed to the coating industry where the VOC content of coating formulas has been drastically reduced in recent years. Governments have established regulations setting forth guidelines relating to VOCs which may be released to the atmosphere. The U.S. Environmental Protection Agency (EPA) has established guidelines limiting the amount of VOCs released to the atmosphere, such guidelines being scheduled for adoption or having been adopted by various states of the United States. Guidelines relating to VOCs such as those of the EPA, and environmental concerns are particularly pertinent to the paint and industrial coating industries which uses organic solvents which are emitted into the atmosphere. There is growing concern in the wood processing industry that further guidelines will be established with respect to VOCs released during drying of wood products. The present invention is directed to a method for reducing the VOCs which are emitted from wood products when the wood products are dried.

Accordingly, it is a principal object of the present invention to provide a method for reducing the VOCs in wood products prior to drying the wood products.

It is another object of the present invention to capture VOCs from wood products so that the VOCs can be recovered in a suitable manner.

These and other objects of the invention will become more apparent from the following detailed description of the invention and the accompanying drawings.

SUMMARY OF THE INVENTION

Figure 1:
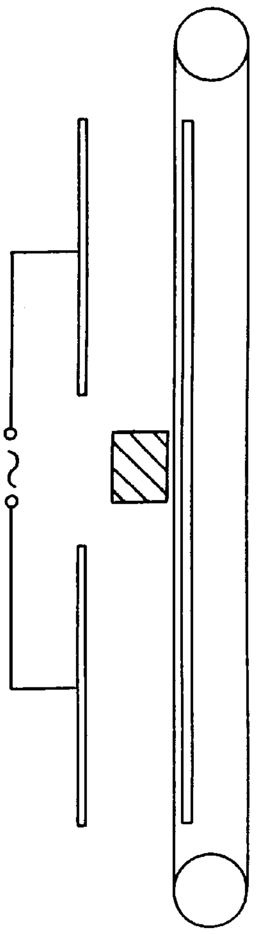
FIG. 1 is a schematic view of the RF dryer used in the method of the invention.

The present invention is directed to a method for removal of VOCs from wood products prior to drying the wood products. The method of the invention includes the steps of providing a chamber having an opening for receiving wood and loading the chamber with green wood. The wood is loaded to an extent sufficient to provide a limited headspace in the chamber. The chamber is then closed and the wood is heated in the chamber for a time and at a temperature sufficient to saturate the headspace with moisture and to substantially transfer VOCs from the wood product to the moisture in the headspace.

DETAILED DESCRIPTION OF THE INVENTION

Generally, in accordance with the invention, a wood product, such as dimension lumber or wood particles, is placed in a chamber which can be sealed. The wood product is loaded in the chamber to an extent that the headspace (void volume) of the chamber is limited. Preferably, the headspace should be from about 2% to about 50% of the total volume of the chamber.

The chamber is then closed and the wood product is heated in the chamber. Because of the limited headspace, the amount of moisture driven from the wood product quickly saturates the headspace. The amount of moisture lost by the wood product is limited. When steam is used at the heating source, no substantial drying of the wood product occurs. The wood product generally has from about 50% to about 130% initial moisture by weight and has from about 50% to about 130% final moisture by weight after the heating step based on the weight of the dry wood content. Any type of wood product can be treated by the method of the invention. Suitable wood products include dimension lumber, particles, oriented strand board and veneers.

The wood product is heated in the chamber to a temperature of from about 70° C. to about 150° C. and is held at that temperature for a period of from about 1 minute to about 2 days. During the heating step VOCs, principally terpene, are driven from the interior of the wood product to the moisture in the headspace. It is believed that the water generated in the headspace by the heating step circulates in the wood (since the moisture cannot escape) and moves the VOCs from the interior of the wood to the surface from which the VOCs evaporate into the headspace moisture. The method of the present invention is sufficient to remove from about 20% to about 90o of the VOC content of the wood product to the headspace moisture. The moisture with the dissolved VOCs can then be recovered by venting the headspace to a suitable container. The heating of the wood product can be effected by any suitable means. In particular, electromagnetic energy and steam are the preferred heating methods. Electromagnetic energy includes radio frequency energy, microwave energy and other frequencies capable of transferring energy to the moisture in the wood. It is preferred to use radio frequency energy when heating dimension lumber in the chamber. Steam is preferred to treat wood particles.

The following examples further illustrate various features of the present invention.

EXAMPLE 1

A schematic of a Strayfield RF dryer that was used to heat dimension lumber is provided in FIG. 1. The gap between two plates was set at 7 inches and the dryer was run at a current setting of 0.6 A. The lumber was wrapped in plastic (to provide a low headspace situation) and placed at the center of the heating zone in the dryer. The lumber was irradiated at 27.12 MHz.

Figure 2:
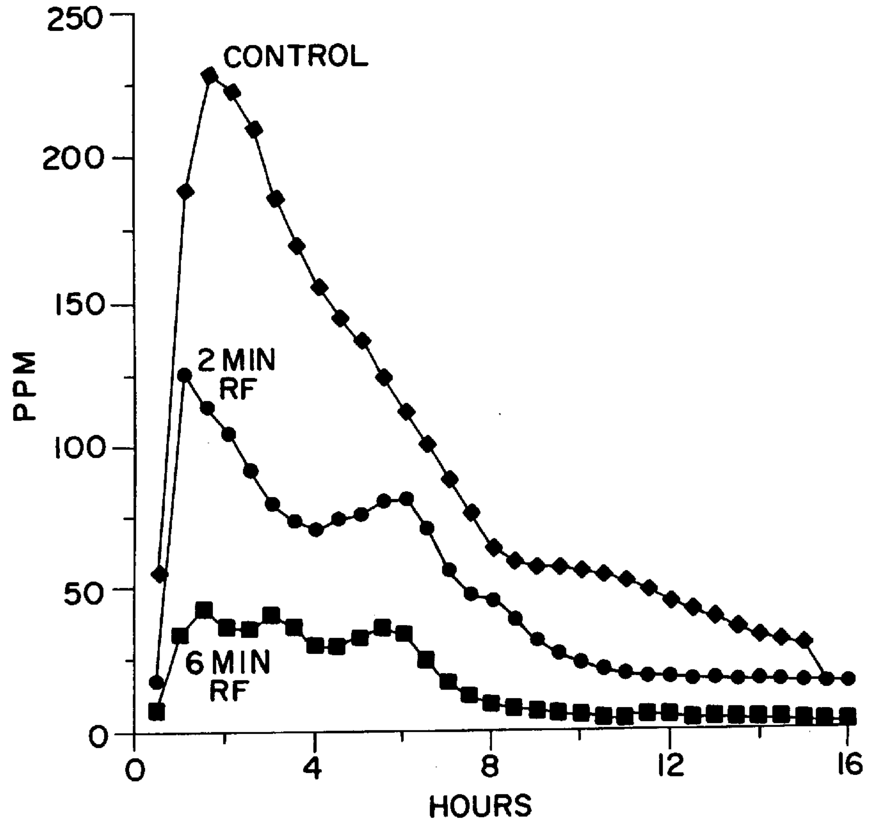
FIG. 2 is a plot of VOCs v. time during drying of a wood product.

Three matched charges of wood were prepared;

each contained two (1.75"×3.5"×23") boards for a wood volume of 0.082 cubic feet. Two of these charges were wrapped in plastic and irradiated for 2 minutes and 6 minutes respectively with an applied current of 0.6A. The third served as a control. All three charges were then dried in a pilot kiln. Moisture data are listed in Table 1, and the profiles of the VOCs that remained in the lumber are illustrated in FIG. 2. The results demonstrate that a significant amount of the VOCs can be removed in the 2-minute treatment (FIG. 2) with essentially no loss of water. Most of the VOCs are removed during the 6 minute RF treatment, but 25% of the available water is also lost. The user, therefore, has the option of losing a substantial fraction of the VOC with very little power consumption, or significantly more of the VOC with higher power consumption. The trade-off will be dictated by the relative costs of power and control devices.

TABLE 1

Moisture Loss from Lumber during RF Treatment

| RF time (min.) | $W_{initial}$ (lbs.) | $W_{post\text{-}RF}$ (lbs.) | $W_{final}$ (after drying (lbs.) | $MC_{initial}$[1] (%) | $MC_{post\text{-}RF}$ (%) | VOC (lbs per dry ton) |
|---|---|---|---|---|---|---|
| 0 (control) | 10.24 | | 5.04 | 103.2 | | 2.86 |
| 2 | 10.02 | 9.93 | 5.03 | 99.2 | 97.4 | 1.46 |
| 6 | 8.68 | 7.79 | 4.79 | 81.2 | 62.6 | 1.05 |

[1]MC is Moisture Content

EXAMPLE 2

Sawdust wood particles were treated with steam in a low headspace environment. Since the headspace is saturated with water vapor, moisture is not lost from the particles. However, the headspace is not saturated with terpene which is able to transfer substantially into the headspace. The terpene can be collected from the low-volume headspace since it represents a valuable product.

Figure 3:
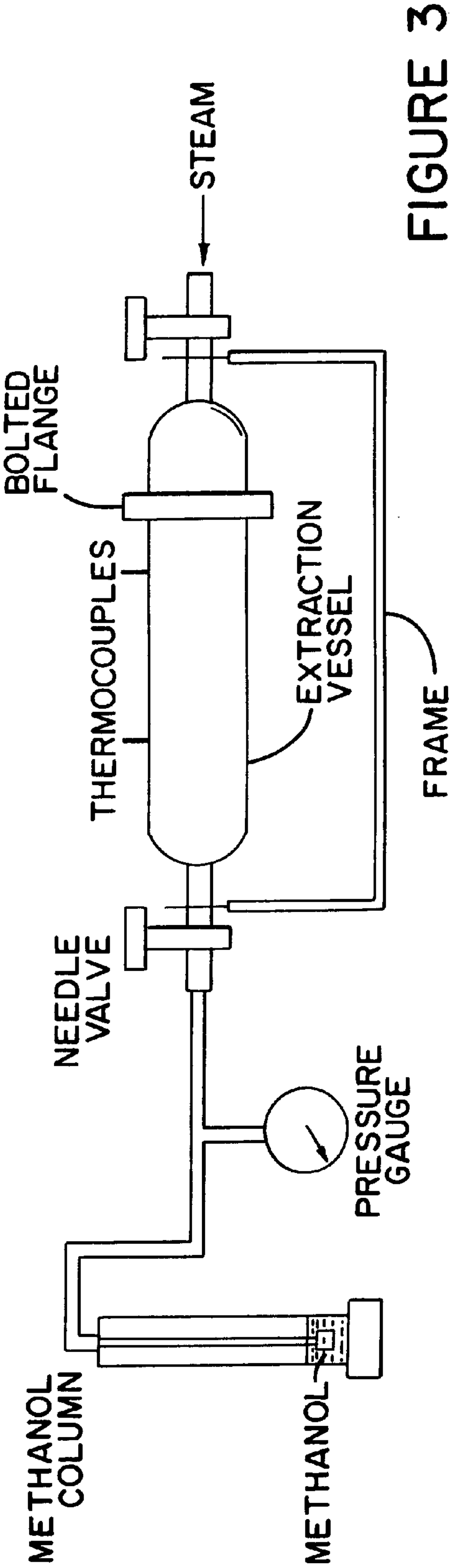
FIG. 3 is a schematic of a steam chamber used in the method of the invention.

The laboratory apparatus used is illustrated in FIG. 3. The unit is a 60 cm long by 10 cm diameter stainless steel pressure vessel. The outlet from the vessel is fed to a methanol column for recovery of the VOCs. Each experiment was conducted by loading 400 g of wood particles into the vessel, which was then sealed. Thermocouples were positioned, and heating tapes activated in order to heat the exterior of the vessel to minimize steam condensation. Ambient pressure steam was injected into the vessel for 3 minutes and the vessel was sealed by closing the needle valve. In order to separate the effects of temperature and pressure, the wood particles were first steamed at about 167° C. for 10 minutes under sealed conditions (with the valve closed) and then for 20 minutes with the needle valve slightly open. The steamed wood was then heated to dryness in a tube furnace and the VOCs measured. The difference between steamed and control (unsteamed) samples was the amount of VOC removed during steaming. The results of these experiments are set forth in Table 2 as the series 177 measurements.

Substantial VOC removal occurred during steaming. Runs were also made where the needle valve was opened partially immediately after steam-charging was complete, i.e., the material was steamed continuously at approximately atmospheric pressure. The results, designated as the 178 series in Table 2 show VOC removal of about 65%. These results demonstrate that high temperature, not high pressure, is the key to VOC extraction.

TABLE 2

VOC Emissions from Wood Particles

| Run | Steam Time (min) | Steam Temp. (° C.) | VOC ($\mu$g/g, dry basis) 30 min drying |
|---|---|---|---|
| CONTROL | | | 1250 |
| 177-1[1] | 30 | 167 | 346 |
| 177-2[1] | 30 | 167 | 351 |
| 177-3[1] | 30 | 167 | 348 |
| 177-4[1] | 30 | 167 | 346 |
| AVG. | | | 348 |
| 178-1 | 30 | 168 | 457 |
| 178-2 | 30 | 168 | 411 |
| 178-3 | 30 | 168 | 471 |
| 178-4 | 30 | 168 | 366 |
| AVG. | | | 426 |

[1]sealed for the first 10 minutes

EXAMPLE 3

Figure 4:
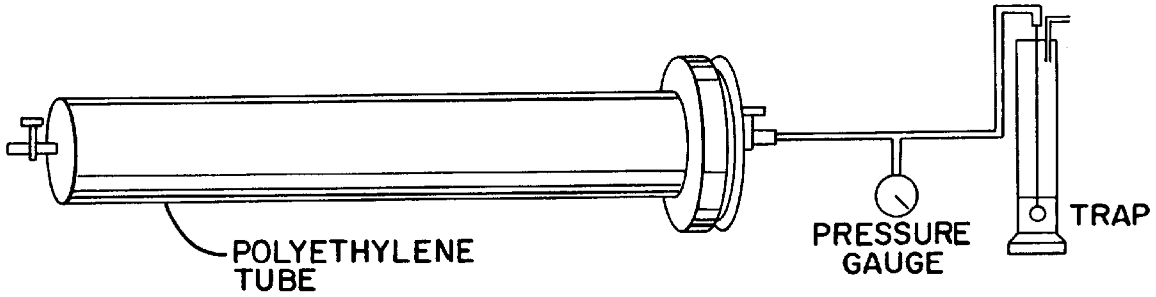
FIG. 4 is a schematic of apparatus useful for processing wood products by electromagnetic energy.
Figure 5:
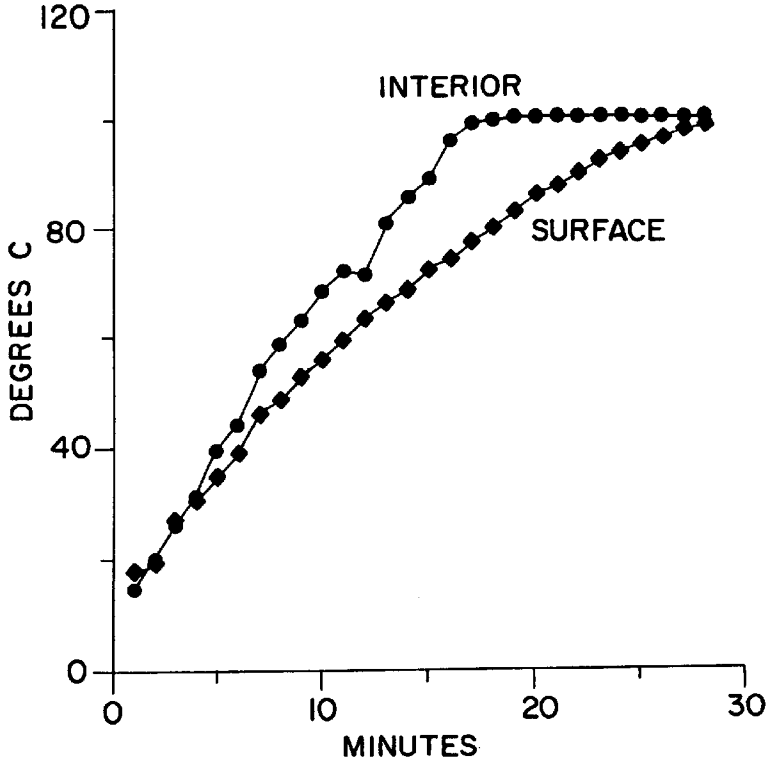
FIGS. 5–8 are interior and exterior temperature profiles for the wood products treated in Table 3.
Figure 6:
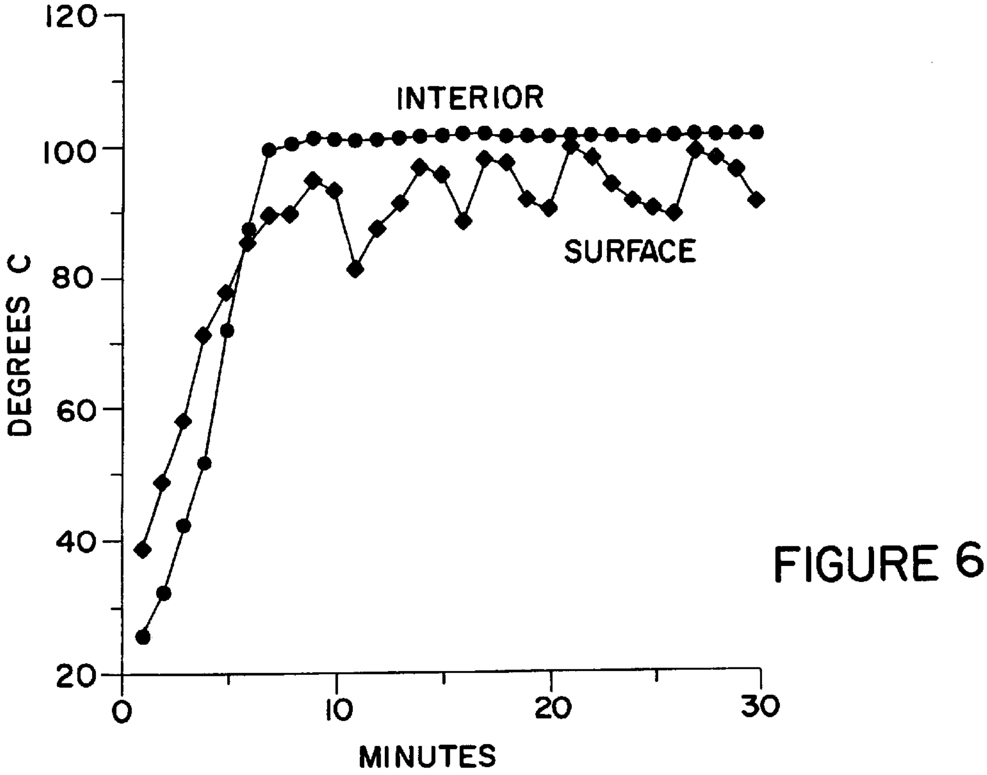
Figure 7:
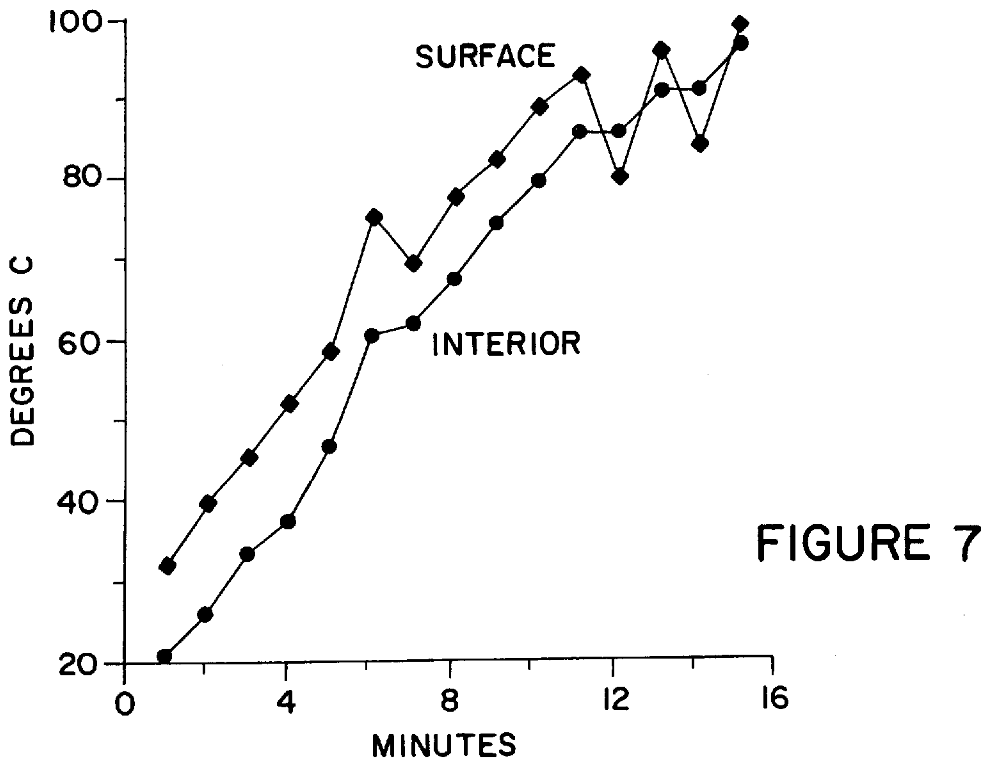
Figure 8:
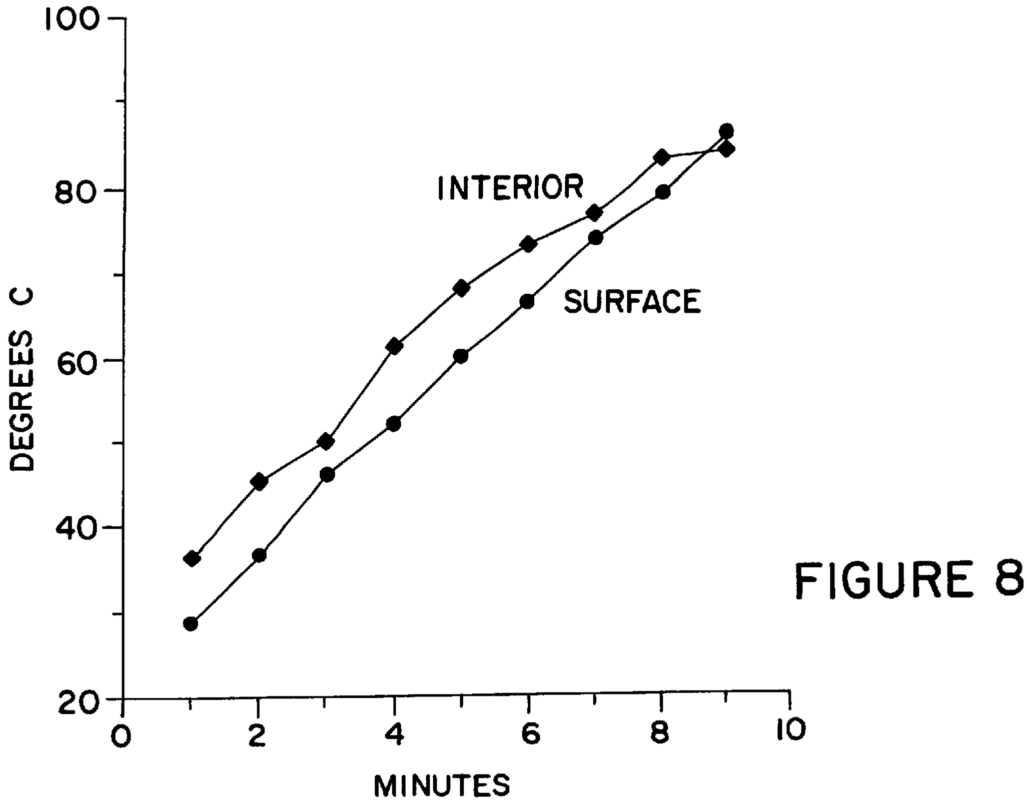

The low-headspace extraction vessel shown in FIG. 4 was constructed for use between radio frequency plates (not shown). The unit is a 1.2 m long by 11.4 cm OD polyethylene tube with a polyethylene flange heat-welded at one end, and a plate welded at the opposite end. Teflon shutoff valves were installed at both ends. A trap containing water was connected to one end of the extraction vessel. Fiberglass thermocouples were used to determine the surface and internal temperatures of the board during irradiation. The internal temperature was obtained by inserting the thermocouple into a pre-drilled hole in the lumber which reached the board center-line. Four experiments were conducted on 2"×3.75"×48" pine boards as follows:

30 minutes of continuous RF treatment at 0.8 amps;

30 minutes of intermittent RF treatment at 1.1 amps with the power being manually cycled on and off to maintain the surface temperature at about 90° C.;

repetition of the above treatment for 15 minutes;

RF treatment until pressure build-up in the vessel indicated the release of steam.

Figure 9:
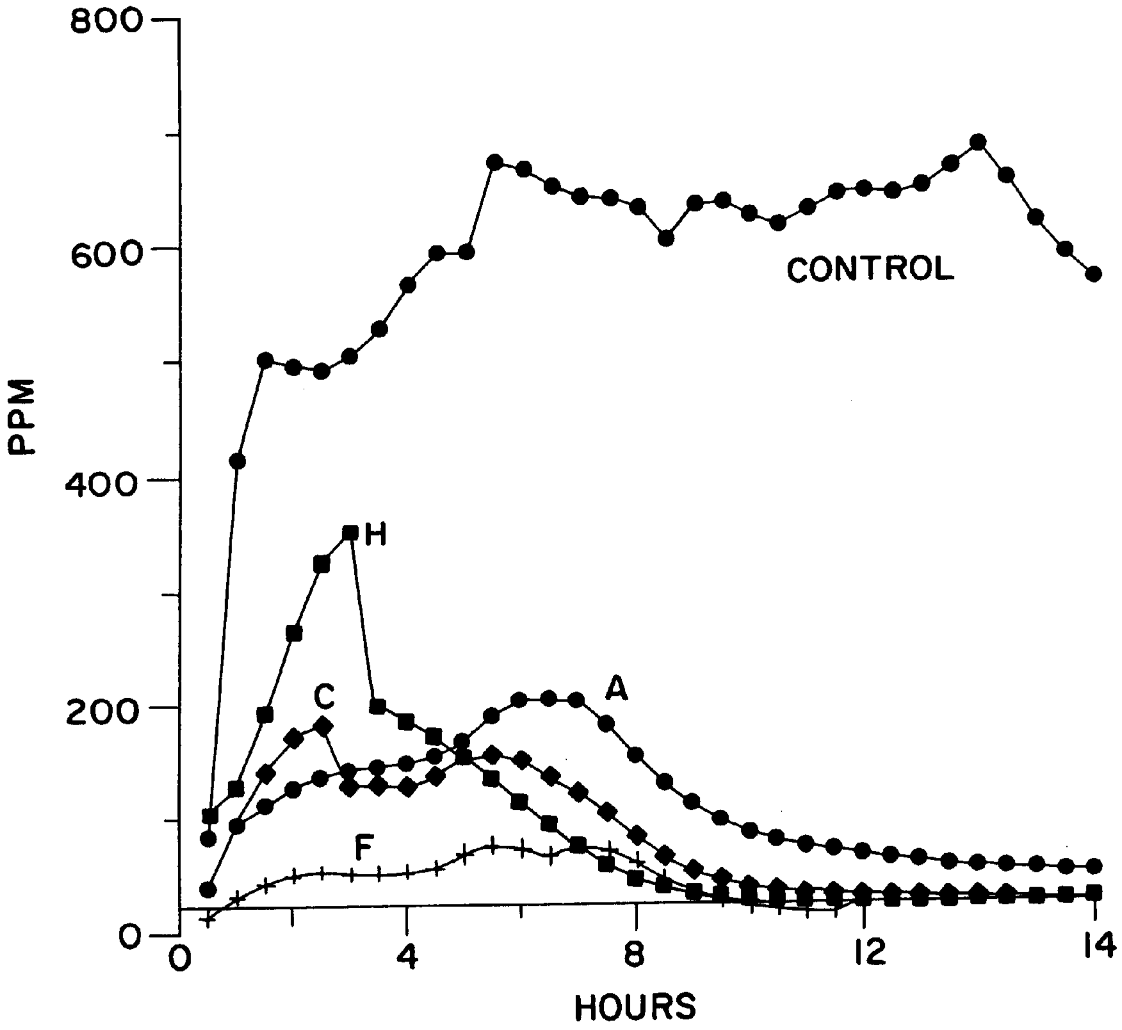
FIG. 9 is the VOC emission profile generated during drying of wood products treated in Table 3.

Table 3 presents the summary of the RF treatment experiments. The RF time reflects the irradiation time; the total time includes the additional time the wood was in the cylinder, regardless of whether or not the RF unit was on. The temperature profiles of the various experiments are shown in FIGS. 5–8. The VOC profiles are illustrated in FIG. 9.

Entries F and H in Table 3 received the same amount of radiation, but the former was kept in the unit for a longer period, and the wood was exposed to saturated headspace conditions for a longer period. Increasing power (comparison of C and F) and exposure period (H and A) increased the amount of VOC removed. VOC reduction of 79% was observed in the best case (F). Importantly, this was achieved with minimal water loss, which opens the prospect of being able to drive out and collect the VOCs through low-headspace RF treatment, and to then dry the wood conventionally with much lower releases of VOCs. The power requirement should be low since the RF field is not used to evaporate water, but only to maintain the wood at a set temperature.

TABLE 3

VOCs from RF-treated wood[1]

| ID | Weight Loss (%) | VOC (lbs/ton) | RF Power (amp) | RF time/total time (min) |
|---|---|---|---|---|
| Control | na | 3.69 | na | 0 |
| C | 2.8 | 1.67 | 0.8 | 30/30 |
| F | 4.0 | 0.77 | 1.1 | 12/30 |
| H | 3.8 | 1.81 | 1.1 | 12/15 |
| A | 2.2 | 2.27 | 1.1 | 9/9 |

[1]green basis

What is claimed is:

1. An undried, treated wood product which has a reduced level of VOCs, wherein the wood product has from about 50% to about 130% final moisture by weight.

2. A wood product in accordance with claim 1 wherein from about 20% to about 90% of the VOCs have been removed from said wood product as compared to a green wood product.

3. A wood product in accordance with claim 1 wherein said wood product is selected from the group consisting of dimension lumber, particles, oriented strand board particles and veneers.

4. A wood product in accordance with claim 3 wherein said wood product comprises dimension lumber.

5. A wood product in accordance with claim 3 wherein said wood product comprises particles.

6. A wood product in accordance with claim 3 wherein said wood product comprises oriented strand board particles.

7. A wood product in accordance with claim 3 wherein said wood product comprises veneers.

* * * * *